(12) United States Patent
Johansson

(10) Patent No.: US 6,755,021 B2
(45) Date of Patent: Jun. 29, 2004

(54) ON-BOARD HYDROGEN GAS PRODUCTION SYSTEM FOR STIRLING ENGINES

(75) Inventor: Lennart N. Johansson, Ann Arbor, MI (US)

(73) Assignee: STM Power, Inc., Ann Arbor, MI (US)

( * ) Notice: Subject to any disclaimer, the term of this patent is extended or adjusted under 35 U.S.C. 154(b) by 0 days.

(21) Appl. No.: 10/246,064

(22) Filed: Sep. 18, 2002

(65) Prior Publication Data
US 2004/0050043 A1 Mar. 18, 2004

(51) Int. Cl.⁷ .................................................. F02G 1/04
(52) U.S. Cl. ............................ 60/517; 60/521; 60/522; 60/659
(58) Field of Search ........................ 62/46.2; 60/517, 60/521, 522, 659

(56) References Cited

U.S. PATENT DOCUMENTS

| | | | |
|---|---|---|---|
| 4,881,372 A | * | 11/1989 | Naito ............................ 60/521 |
| 4,996,841 A | | 3/1991 | Meijer et al. |
| 5,074,114 A | | 12/1991 | Meijer et al. |
| 5,473,904 A | * | 12/1995 | Guo et al. ................... 62/46.2 |
| 5,611,201 A | | 3/1997 | Houtman |
| 5,697,221 A | | 12/1997 | Sapru et al. |
| 5,706,659 A | | 1/1998 | Houtman et al. |
| 5,722,239 A | | 3/1998 | Houtman |
| 5,771,694 A | | 6/1998 | Houtman et al. |
| 5,813,229 A | | 9/1998 | Gaiser |
| 5,836,846 A | | 11/1998 | Hewko et al. |
| 5,864,770 A | | 1/1999 | Ziph et al. |

* cited by examiner

*Primary Examiner*—Sheldon J. Richter
(74) *Attorney, Agent, or Firm*—Brinks Hofer Gilson & Lione

(57) ABSTRACT

A hydrogen production system for use in connection with Stirling engines. The production system generates hydrogen working gas and periodically supplies it to the Stirling engine as its working fluid in instances where loss of such working fluid occurs through usage through operation of the associated Stirling engine. The hydrogen gas may be generated by various techniques including electrolysis and stored by various means including the use of a metal hydride absorbing material. By controlling the temperature of the absorbing material, the stored hydrogen gas may be provided to the Stirling engine as needed.

15 Claims, 1 Drawing Sheet

ON-BOARD HYDROGEN GAS PRODUCTION SYSTEM FOR STIRLING ENGINES

FIELD OF THE INVENTION

This invention relates to a Stirling engine and particularly to a system for producing a working fluid for the Stirling engine.

BACKGROUND OF THE INVENTION

The Stirling engine is based on a thermodynamic principle similar to that of an internal combustion engine, namely, if gas is compressed at low temperature and then is heated and allowed to expand, mechanical energy is produced. In the Stirling engine, however, the method of heating the gases is different from that of the internal combustion engine.

In that Stirling engines are operated on a closed thermodynamic cycle, they are reversible in terms of their thermodynamic output. In one configuration, heat is absorbed by the engine and converted to mechanical work through a rotating shaft. In another operating condition, mechanical power input can be converted to thermal outputs in the terms of cooling or heating capacity.

The working gas or working fluid, which in modern Stirling engines is typically helium or hydrogen, is shuttled from a space where it is at a constant high temperature into a space at which it is a constant low temperature. In order to obtain mechanical energy from this process, the working gas must be compressed where it is mainly in the cold space and allowed to expand where it is mainly in the hot space. In order not to lose heat during this shuttling process, a regenerator is placed between the hot and cold spaces. A regenerator is a space filled with course material, such as layers of very fine metallic gauze. The material captures the heat of the gas as it flows from the hot space to the cold space, and returns its heat to the gas on its way back to the hot space.

The assignee of the present application, STM Power, Inc., is a pioneer in the development of modern Stirling cycle engines. Its current design of its model "4-120" engine is a four cylinder, double-acting type using a swashplate kinematic drive. Patents describing this basic engine configuration include U.S. Pat. Nos. 4,996,841; 5,074,114; 5,611,201; 5,706,659; 5,722,239; 5,771,694; 5,813,229; 5,836,846; and 5,864,770 which are hereby incorporated by reference.

Although presently available Stirling engines have enormous potential for commercial applications, there are certain design challenges which remain. Presently, hydrogen is the preferred working gas for Stirling engines, since it provides higher overall thermal conversion efficiency than provided by the use of helium as a working gas. The use of hydrogen has a number of drawbacks however. Hydrogen, being the simplest element, has the smallest atomic size known and therefore escapes through various leakage paths or by diffusion through solid materials.

In the Stirling engine configurations produced by the Assignee, hydrogen losses may occur at various locations. The kinematic drive system for the displacer pistons is coupled to the pistons through the use of reciprocating shafts. The reciprocating shafts pass through sliding contact seals which are provided to isolate the hydrogen working fluid from atmosphere. The requirements for sealing hydrogen in the environment of a reciprocating sliding contact is a significant design challenge. Highly sophisticated and costly sealing systems may be used for this application to reduce or virtually eliminate hydrogen leakage. For example, bellows-types and other sealing arrangements have been considered. Although sliding contact rod seals and bellow-type arrangements are capable of significantly reducing the loss of hydrogen gas, they are often costly to produce, sensitive to wear, and in some cases, my not have sufficient durability lifetimes for the intended applications.

Another principal point of loss of hydrogen gas occurs at the heater head of the engine. Since it is necessary to heat the gas at one side of its cycle, a heater head is provided which is exposed to hot combustion gases, solar energy, or other heat sources. The elevated temperature of the materials which comprise the heater head of the engine further exacerbates diffusion losses. Diffusion is a transport mechanism in which hydrogen travels directly through microscopic voids in the material and this process is accelerated at high temperatures. Numerous technologies related to the use of coatings and other approaches to reducing this source of gas loss, have also been considered. Once again, costs and other factors are drawbacks. Hydrogen gas loss is often divided into static leakage occurring when the machine is not operating, and dynamic leakage during operation.

There are numerous potential applications for Stirling engines which require long term efficient operation. For those applications, it is necessary to ensure that the sufficient charge of working gas remains within the engine through the operational lifetime. As mentioned previously, one approach is to minimize all losses of working fluid. If such losses can be maintained at a sufficiently low rate, it may be possible to periodically supplement the working gas by "recharging" the engine as it is serviced. This solution may, however, not be sufficient in certain applications unless leakage rate and service intervals are appropriate.

This invention addresses the problem of Stirling engine working gas loss through another approach; namely, to produce in a subsystem coupled directly with the Stirling engine sufficient hydrogen working gas to supplement the initial charge upon the occurrence of loss of hydrogen working gas. If sufficient quantities of hydrogen gas may efficiently produced such a mechanism, a certain rate of hydrogen loss may be tolerated. Through this approach, substantial extensions of operating lifetime are achievable. Since the system is preferably portable with the engine, it is available to supplement the working gas charge wherever the engine travels, which is especially important for motor vehicle, portable or airborne systems implementing Stirling engines, or otherwise where access is inconvenient or unavailable.

SUMMARY OF THE INVENTION

In accordance with this invention, an onboard hydrogen gas production system is provided which incorporates a reservoir of a hydrogen containing material such as ordinary water. This liquid is reformed by electrolysis, thus separating it into its fundamental elements which, in the case of water, are oxygen and hydrogen. The hydrogen produced in this manner is stored in a reservoir and preferably a reservoir containing a metal hydride storage material. By controlling the temperature of the metal hydride in the reservoir, hydrogen which has been stored can be liberated and pumped into the Stirling engine as needed. This system responds to a charge state signal from the Stirling engine related to the state of working gas charge.

Additional benefits and advantages of the present invention will become apparent to those skilled in the art to which the present invention relates from the subsequent description of the preferred embodiment and the appended claims taken in conjunction with the accompanying drawings.

DETAILED DESCRIPTION OF THE INVENTION

Figure 1:
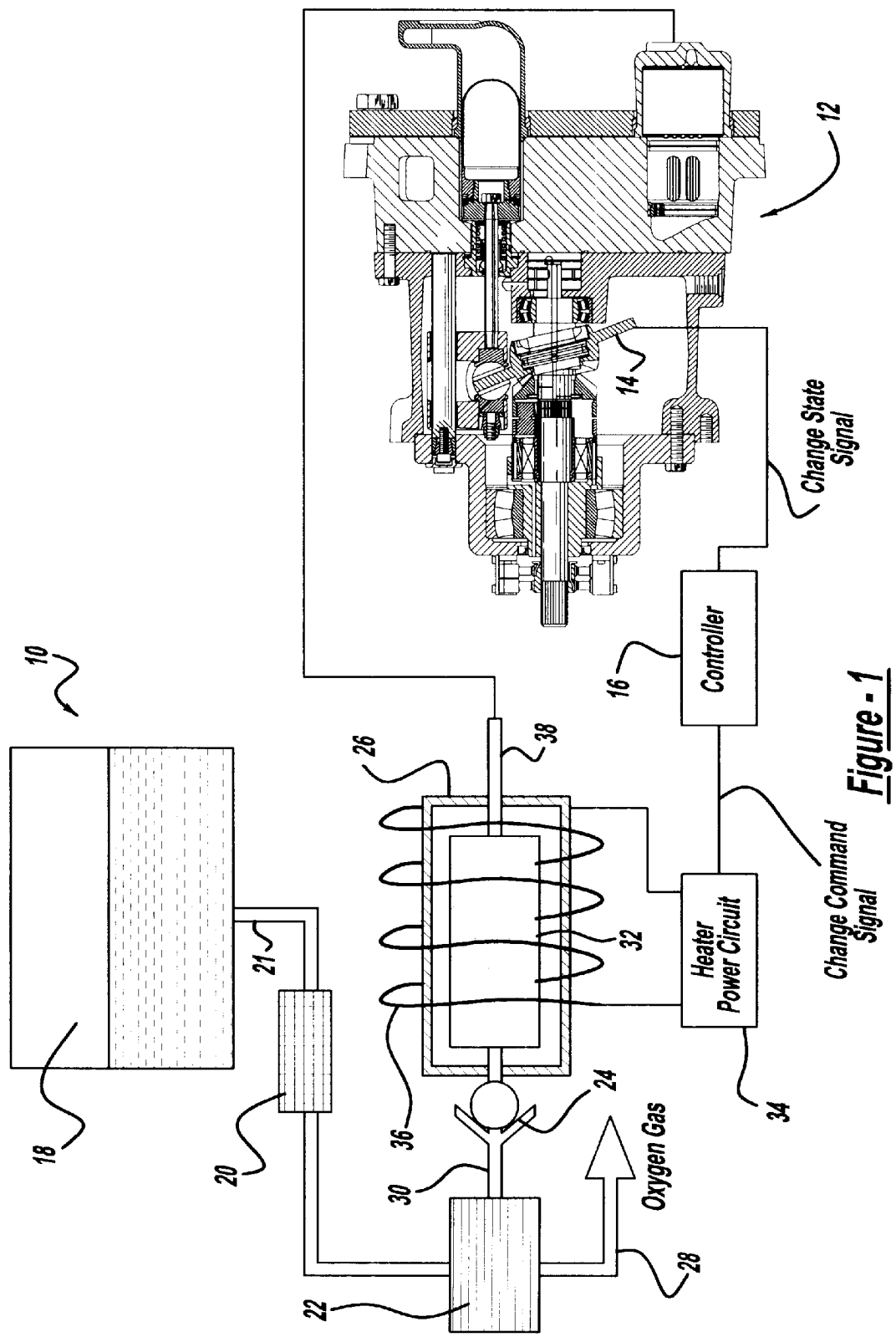
FIG. 1 is a diagrammatic view of an on-board gas production system for Stirling engines in accordance with this invention.

With reference to FIG. 1, an on-board hydrogen production system in accordance with this invention is shown and is generally designated by reference number 10. Production system 10 is shown coupled with a representative Stirling engine 12. Stirling engine 12 may be any one of numerous designs for Stirling engines including those described by the previously mentioned patents assigned to the Assignee of this application. Stirling engine 12 would be of a type which employs hydrogen as the working gas and would be subject to the periodic need to recharge its supply of working gas via the mechanisms of static and/or dynamic loss. Stirling engine 12 features internal working gas pressure sensor 14. Pressure sensor 14 would be placed in a portion of the engine 12 subject to either a cyclically pressure wave associated with the working gas volumes as they are cycled between other areas of the engine or to some other place where a less time varying pressure variation would be detected. For example, through the use of an orifice and a small reservoir, a mean pressure signal could be provided. While internal pressures of various Stirling engines differ, in one representative design, a mean pressure of 15 mpa is used, with cyclical variations producing a minimum pressure of 12 mpa and a maximum pressure of 18 mpa. The output signal from pressure sensor 14, termed a charge state signal, is sent to controller 16 which controls operation of production system 10 in a manner which is described more fully in the following sections of this description.

With continued reference to FIG. 1, production system 10 principally comprises water storage vessel 18, filter 20, electrolyzer 22, check valve 24, and storage reservoir 26.

Storage vessel 18 is filled with an initial charge of a hydrogen containing liquid, preferably highly purified water. This water, which may be stored in a liquid form at various pressures and temperatures, is directed to pass through filter 20 via conduit 21 where any particulates, minerals, and other contaminants may be removed. Next, the water passes into hydrolyser 22 which acts as a reformer, liberating pure hydrogen from the water.

It is fundamental principal of electrochemistry that water may be separated into its constituent elements; namely, gaseous oxygen and hydrogen through electrolysis. In electrolysis, two electrodes are maintained at opposite potentials. Gas bubbles of pure oxygen form at one electrode whereas gas bubbles of pure hydrogen occur at the other. A more sophisticated form of this technology employs a so-called proton exchange membrane, which is preferred for this application. From electrolyzer 22 where electrolysis occurs, two pathways are shown. Conduit 28 allows pure oxygen gas to be either vented to atmosphere or sent to an onboard combustion device. This would be useful for applications in which a hydrocarbon fuel is combusted to produce heat for Stirling engine 12. Absent such a use of the oxygen gas, it can be harmlessly vented to atmosphere. Hydrogen gas which is produced passes through conduit 30 through one-way check valve 24. Check valve 24 ensures that hydrogen gas which is produced may only travel in the direction from electrolyzer 22 into storage reservoir 26.

Storage reservoir 26 includes an internal storage material, such as a metal hydride material 32. Storing of hydrogen in a hydride form involves the use of an alloy which can absorb and hold large amounts of hydrogen by bonding with hydrogen and forming hydrides. In the absorption process, hydrogen gas molecules stick to the metal surface and break down into hydrogen atoms. The hydrogen atoms penetrate into the interior of the metal crystal to form a new solid substance, referred to as a metal hydride. This process is an exothermic reaction. In the converse process, in which it is desired to desorb the hydrogen through an endothermic reaction, hydrogen atoms migrate to the surface of the metal hydride and flow away as hydrogen gas. Various metal materials may be used to form the metal hydride including metal alloys containing titanium, zirconium, chromium, and manganese. Since the absorption and desorption processes are exothermic and endothermic respectively, the processes can be controlled by temperature. Thus, the mass of hydrogen gas which may be stored in an absorbed form with metal hydride 32 decreases with increasing temperature. Using this principle, storage reservoir 26 may be maintained at an ambient or relatively low temperature in its normal condition. In this state, a significant quantity of hydrogen gas may be absorbed by the metal hydride 32.

When it is desired to desorb the hydrogen, for example to charge Stirling engine 12, the temperature of the storage reservoir 26 and/or metal hydride 32, is elevated. This is achieved through the use of heater power circuit 34 and reservoir resistance heater 36. Thus, upon an appropriate charge command control signal from controller 16, heater power circuit 34 applies an electrical potential to reservoir heater 36. Current passing through the reservoir heater rapidly increases the temperature of reservoir 26, causing desorption of the stored hydrogen gas. This hydrogen gas is transmitted into engine 12 via conduit 38. By choosing an appropriate temperature for elevation of reservoir 26, an appropriate pressure of supplied hydrogen gas may be generated to force this gas into Stirling engine 12.

The process of charging engine 12 with working gas may be supplemented if conduit 38 communicates with a portion of Stirling engine 12 undergoing a cyclical working gas pressure variation. Through the use of another check valve (not shown), gas may be supplied to engine 12 whenever the supply gas is greater than the gas pressure at any point in its cyclical pressure variation cycle. As mentioned previously, a representative Stirling engine design has a minimum working gas pressure of 12 mpa. Accordingly, it is necessary to produce hydrogen at a pressure no less than 12 mpa in order to charge the previously described engine.

Additional variations of the design of production system 10 may also be implemented within the scope of the present invention. For example, in some instances, the quantity of stored hydrogen may be sufficient if storage reservoir 26 is initially charged with hydrogen gas. If sufficient metal hydride or other absorber material is available, a sufficient mass of hydrogen gas may be storable in such a reservoir to enable hydrogen gas supplementation to be provided over an acceptable operating life span without the need of generating additional hydrogen gas with the system. Such a system is identical to that of FIG. 1 with elements 18, 20, 21, 22, and 24 eliminated. Other variations include the use of other types of absorbers or other storage systems. Moreover, multi-stage type systems might also be implemented with different types of absorber material being provided to sequentially elevate the pressure of the hydrogen gas as it moves from being generated to its point of injection into Stirling engine 12.

While the above description constitutes the preferred embodiment of the present invention, it will be appreciated that the invention is susceptible to modification, variation and change without departing from the proper scope and fair meaning of the accompanying claims.

What is claimed is:

1. A hydrogen production system for providing hydrogen to a Stirling engine as a working gas to replace hydrogen lost from the engine over time, comprising:
   a hydrogen storage reservoir for storing the hydrogen;
   a sensor for measuring pressure of the Stirling engine working gas related to the level of charge of hydrogen working gas in the engine and providing a charge state signal when the level of the charge is below a predetermined level; and
   a controller receiving the charge state signal and sending a charge command signal to the hydrogen storage reservoir for causing at least some portion of the hydrogen stored in the reservoir to be discharged into the engine to thereby replenish the hydrogen working gas.

2. A hydrogen generation system according to claim 1, wherein said hydrogen storage reservoir includes a metal hydride and further comprising a heating means for applying heat to the metal hydride for causing the desorbtion of the hydrogen from the metal hydride in response to the charge command signal.

3. A hydrogen generation system according to claim 2 wherein the heating means comprises an electrical resistance heater.

4. A hydrogen production system for producing and providing hydrogen to a Stirling engine as a working gas to replace hydrogen lost from the engine over time, comprising:
   a vessel for containing a liquid containing hydrogen;
   a reformer for converting the liquid from the vessel into pure hydrogen;
   a hydrogen storage reservoir for receiving and storing the hydrogen from the reformer;
   a sensor for measuring a parameter of the Stirling engine related to the level of charge of hydrogen working gas in the engine and providing a charge state signal when the level of the charge is below a predetermined level; and
   a controller receiving the charge state signal and sending a charge command signal to the hydrogen storage reservoir for causing at least some portion of the hydrogen stored in the reservoir to be discharged into the engine to thereby replenish the hydrogen working gas.

5. A hydrogen generation system according to claim 1 further comprising a check valve placed between the reformer and the storage reservoir for preventing a reverse flow of the hydrogen from the storage reservoir to the reformer.

6. A hydrogen generation system according to claim 1 wherein the liquid is water.

7. A hydrogen generation system according to claim 1 wherein the reformer is an eletrolyzer which forms hydrogen by the process of electrolysis.

8. A hydrogen generation system according to claim 1 wherein the sensor senses pressure.

9. A hydrogen generation system according to claim 1 wherein the hydrogen storage reservoir contains a metal hydride for absorbing hydrogen.

10. A hydrogen generation system according to claim 9 further comprising a heating means for applying heat to the metal hydride for causing the desorbtion of the hydrogen from the metal hydride in response to the charge command signal.

11. A hydrogen generation system according to claim 10 wherein the heating means comprises an electrical resistance heater.

12. A hydrogen production system for producing and providing hydrogen to a Stirling engine as a working gas to replace hydrogen lost from the engine over time, comprising:
   a vessel for containing water;
   an electolyzer for converting the water from the reservoir into pure hydrogen;
   a hydrogen storage reservoir for receiving and storing the hydrogen produced by the eletrolyzer, the hydrogen storage reservoir containing a metal hydride for absorbing the hydrogen;
   a one way check valve placed between the reformer and the storage reservoir for preventing a reverse flow of the hydrogen from the storage reservoir to the electrolyzer;
   a sensor for measuring a parameter of the Stirling engine related to the level of charge of the hydrogen working gas in the engine and providing a charge state signal when the level of the charge is below a predetermined level; and
   a controller receiving the charge state signal and sending a charge command signal to the hydrogen storage reservoir for causing at least some portion of the hydrogen stored in the reservoir to be discharged into the engine to thereby replenish the hydrogen working gas.

13. A hydrogen generation system according to claim 12 further comprising a heating means for applying heat to the metal hydride for causing the desorbtion of the hydrogen from the metal hydride in response to the charge command signal.

14. A hydrogen generation system according to claim 12 wherein the heating means comprises an electrical resistance heater.

15. A hydrogen generation system according to claim 12 wherein the sensor senses pressure.

* * * * *

UNITED STATES PATENT AND TRADEMARK OFFICE
CERTIFICATE OF CORRECTION

PATENT NO. : 6,755,021 B2
DATED : June 29, 2004
INVENTOR(S) : Lennart N. Johansson It is certified that error appears in the above-identified patent and that said Letters Patent is hereby corrected as shown below:

Column 5,
Line 52, change "claim 1" to -- claim 4 --.

Column 6,
Lines 1, 3, 6 and 8, change "claim 1" to -- claim 4 --.

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,755,021 B2  
DATED : June 21, 2004  
INVENTOR(S) : Lennart N. Johansson Page 1 of 1

It is certified that error appears in the above-identified patent and that said Letters Patent is hereby corrected as shown below:

<u>Column 1,</u>  
Line 3, please add the following statement;  
-- This invention was made with Government support under NREL Subcontract No. ZCB-3-13032-01, Prime Contract No. DE-AC02-83CH10093 awarded by the Department of Energy. The Government has certain rights in this invention --.

Signed and Sealed this

Twenty-eighth Day of June, 2005

JON W. DUDAS  
*Director of the United States Patent and Trademark Office*